Patented Oct. 5, 1926.

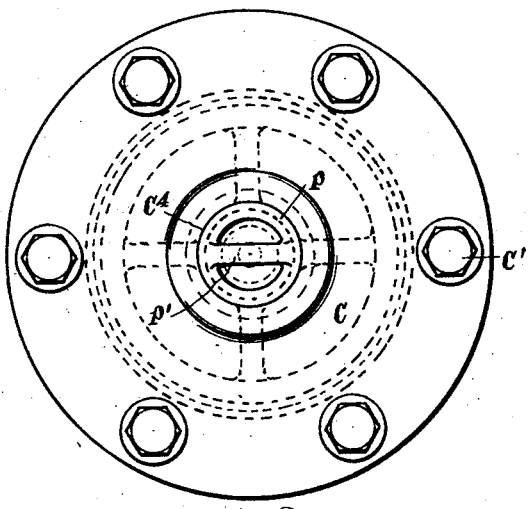
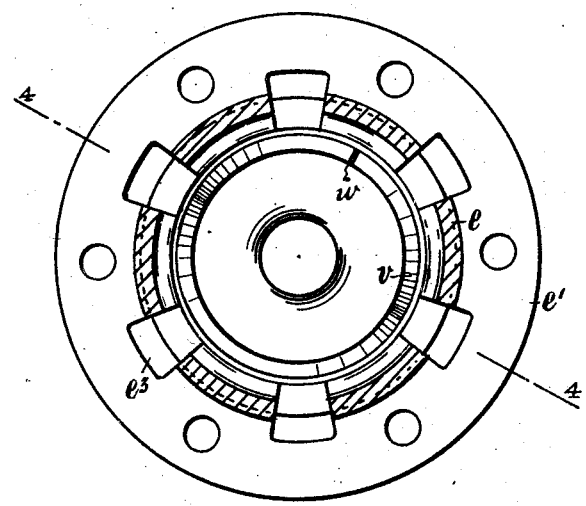
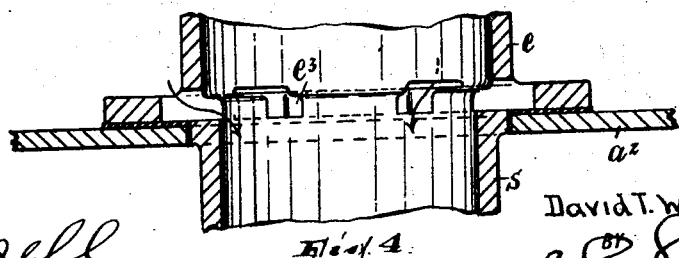

1,602,063

UNITED STATES PATENT OFFICE.

DAVID T. WILLIAMS, OF PATERSON, NEW JERSEY.

LIQUID-LEVEL-GAUGING MEANS.

Application filed June 27, 1923. Serial No. 648,168.

This invention relates to devices for use in determining the amount of liquid in a tank, and particularly to devices for determining the amount of liquid in tanks of the movable class, as the water-tanks of locomotive tenders. The means usually employed for this purpose in the water-tanks of locomotive tenders consists of a two-armed lever fulcrumed on a longitudinal axis in one of the two forwardly projecting extensions of the tank and having a gauging rod pivoted to its forward or shorter arm and extending up through the top of the tank and a float attached to its other or longer arm, which reaches transversely of and in the body part of the tank. On account of the internal bracing means of the tank it is difficult to install this mechanism; and, besides the objection that the gauging rod at all times projects from the tank, in the way, there is the objection that the water is always free to be ejected in considerable volume at the outlet for the gauging rod, due to the surging about thereof in the tank in the stopping and starting and sidewise movements of the tender. Other devices have been proposed and used, but if they are without these faults they are unsatisfactory in other respects, as being expensive to manufacture and install, unreliable for accurately gauging the water-level on account, for example, of efforts to seal the outlet for the gauging rod, or as requiring undue attention to keep them lubricated and otherwise in proper working order.

The object of this invention is to provide an apparatus for use in gauging the quantity of liquid in tanks, and especially liquid tanks of the moving class, by which the attendant can quickly and at all times reliably determine the liquid-level in the tank; which shall be substantial, durable and inexpensive to manufacture and require no lubrication and the minimum of attention and effort to keep it in proper working order; which shall be of such construction as not to permit the liquid to be ejected from the tank or the gauging element to be disturbed or injured by the surging about of the liquid and so that when not in use said element will be housed and out of the way; and which may be fitted to any tank by very simple operations and regardless of the depth of the tank.

In the drawings,

Fig. 2 is a plan of the apparatus;

Fig. 3 is a horizontal section on line 3—3, Fig. 1, the plunger being omitted; and Fig. 4 is a fragmentary vertical section on line 4—4, Fig. 3.

Figure 1:
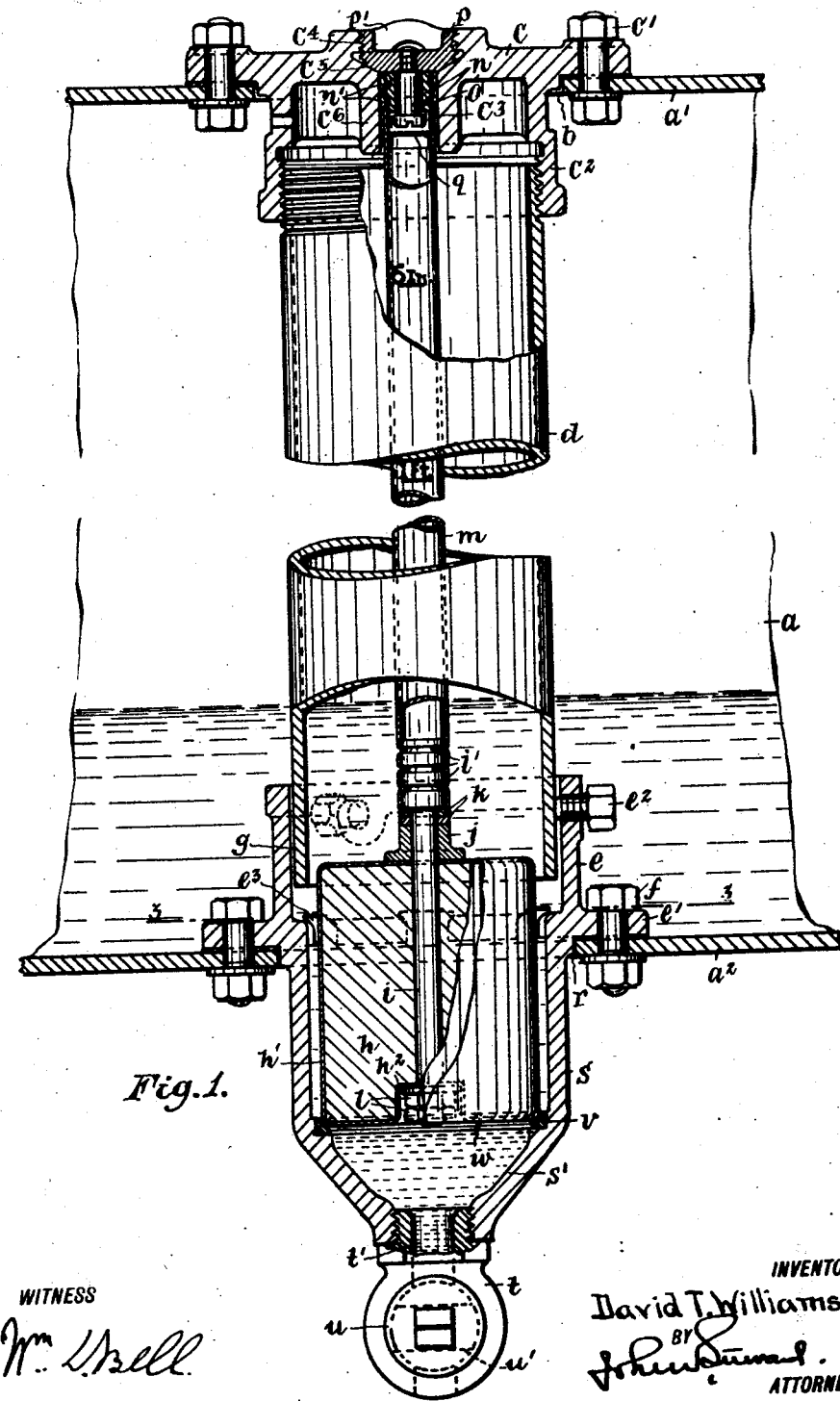
Fig. 1 shows the tank in vertical section and the improved gauging apparatus partly in elevation and partly in section.

$a$ designates the tank. The portion shown would in the case of a locomotive tender be as usual one of the two forward extensions thereof, whereby the gauging means illustrated will be in convenient reach of the fireman.

In the embodiment shown by way of example the top wall $a'$ of the tank has an opening $b$ formed therein for the reception of the structure embodying my invention.

In this opening is fitted a casing which guides the gauging means in its up and down movement substantially rectilineally and also protects it from the surging of the water in the tank. This casing is constructed as follows: There is a head $c$ having an exterior flange by which the head is secured by bolts $c'$ on the top wall $a'$ of the tank, covering its opening $b$. This head is inverted-cup-shaped, its depending wall $c^2$ being internally threaded, and it has a central bore $c^3$ and a counter-bore $c^4$, the latter being provided with a coarse thread and formed with a preferably conical seat $c^5$; the bore $c^3$ is formed in a central depending boss $c^6$ (thus, in effect, a flange) whose function will appear. Into the threading of wall $c^2$ is screwed the upper end of a tubular shell $d$. An annular member $e$, having a flange $e'$ by which it is secured by bolts $f$ to the bottom wall $a^2$ of the tank, forms a telescopic joint with the lower end of shell $d$, which is preferably the received one of the two members $d$ $e$. This joint permits the casing to be fitted to tanks varying in the spacing between their top and bottom walls; the fit is a loose one, with some space $g$ between members $d$ and $e$ so as to permit ready assembling thereof and incidentally allow the water in the tank to enter the casing, and to stay the lower end of member $d$ member $e$ has radial set-screws $e^2$ tapped into it and arranged to bind inwardly against the former. Openings or ports $e^3$ are formed in member $e$ to insure admission of the water to the casing. The parts $c$, $d$ and $e$ may all be formed of cast-iron. It will be observed that the casing is closed to admission of liquid except at its bottom portion.

The gauging element is a plunger preferably constructed as follows: $h$ is a float, being here shown as a cylindrical block of, say, balsa wood having deposited thereon, or otherwise formed to encase the block, a metallic (as copper) coating $h'$, and $i$ is a bolt which extends vertically through the float and has between its head and the top of the float a bushing $j$ and one or more spacers $k$, the lower threaded end of the bolt having nuts $l$ screwed thereon to clamp the float rigidly between them and the bushing, and the nuts being preferably housed in a bottom recess $h^2$ of the float. The head of the bolt is circumferentially grooved, as at $i'$, and fitted over it is the lower end of a light (as aluminum) tube $m$, which is rigidly jointed to the bolt head and sealed at its lower end by having its wall spun or otherwise impressed into the grooves $i'$. This tube is provided with a scale (as 6 in., 1 ft., etc.) reading downwardly, and it projects up through the bore $c^3$ of head $c$. The tube and float are confined by bore $c^3$ and the casing, respectively, against undue lateral lost motion, but their fit with respect to these parts is such that the plunger can rise and fall with perfect freedom. On the upper end of the tube is swivelled a keeper for holding the plunger depressed when not in use, thus: In the tube is fitted a plug $n$ secured therein by being circumferentially grooved, as at $n'$, and having the wall of the tube spun or otherwise impressed into its grooves, and through a central hole in the plug extends the swivel pin $o$ (enlarged or headed below the plug) of an externally threaded cup-shaped keeper $p$ which may be screwed into the counter-bore $c^4$, the keeper being thus adapted to bear against the seat $c^5$ (to prevent escape of liquid) and having a cross-rib $p'$ forming a grip for turning it. The swivel hole in the keeper is large enough to insure perfect freedom thereof to turn, and in order to prevent accumulation of liquid in the tube of the plunger which would alter its displacement and which might otherwise take place through this hole on account of the motion of the liquid in the casing when the tank is full, a sealing disk $q$ is preferably soldered in the tube before the plug $n$ is fitted thereto.

Normally the plunger is held depressed by the keeper being engaged with the head $c$, in the present example by being screwed into the same. When the level of the water in the tank is to be gauged the keeper is released, allowing the plunger to rise and a reading of the level to be taken, whereupon the plunger is pushed down and the keeper again secured to head $c$. Partly because the bore $c^3$ is small, and also because of the depending flange $c^6$, any splashing of the water out through said bore is prevented when a reading is being taken; and when the plunger is depressed the water is prevented from escaping by the keeper, which may be screwed against the seat $c^5$. Thus without requiring the use of packing or glands a substantially liquid-tight construction results.

The liquid having access to the casing only at the bottom the surging thereof in the tank does not affect the plunger, which is thus substantially free of any influence of the liquid to interfere with its vertical movement or injure it.

If there is any slight discrepancy in the calculated displacement of the plunger when its parts are assembled compensation may be effected by increasing or decreasing the number of the spacers $k$ so as to alter the elevation of the scale-tube $m$ relatively to the float.

Should it be desired to gauge levels of the liquid so near the bottom wall $a^2$ as to require the plunger to reach below the bottom wall the member $e$ may be constructed as a pot which depends through an opening $r$ in said wall. To allow for cleaning this pot, as if sediment accumulates therein, it is constructed thus: Its depending portion $s$ has its lower end tapered so as to produce a tapered inner surface $s'$ offering unstable support to sediment accumulating therein. Into the lower end of the pot is screwed a closure consisting of a valve-casing $t$ having a plug-valve $u$ which may be turned to bring its port $u'$ into registry with or so as to close port $t'$ of the valve-casing. Ordinarily, opening the valve will result in cleaning the pot, the sediment passing out with the water; but if such sediment should form a hardened mass, which would more or less seal the opening, the closure as a whole may be removed to allow access to the interior of the pot. In order, in the latter case, to cut off the downward rush of water that would ensue the plunger may be adapted to seat on a gasket $v$, when it then acts as a valve. At $w$ in the gasket, or elsewhere, there may be a small vent to allow the pressures above and below the gasket to become equalized after the closure has been replaced, thus to permit the closure again to function.

Having thus fully described my invention, what I claim as new and desire to secure by Letters Patent is:

1. In combination, a liquid tank having a top wall provided with an opening, a casing arranged in the tank in registry with the opening and including telescoped members respectively carried by the top and bottom walls of the tank and one having a loose fit in the other and means to bind the upper member to the lower member against lateral movement, and a float-plunger in the casing confined thereby to substantially rectilineal up and down movement and adapted to protrude from the top thereof through said opening, 2. In combination, a liquid tank having a top wall provided with an opening, a casing arranged in the tank and including telescoped members respectively carried by the top and bottom walls of the tank and the lower one being annular and receiving the other and having an opening permitting passage of liquid from the tank into said other member at its lower end, the lower member below the upper member having its inside diameter approximately that of the upper member, and a float-plunger in the casing confined to substantially rectilineal up and down movement and guided in such movement by said members and adapted to protrude from the top thereof through the first opening.

3. In combination, a hollow liquid-containing structure having a top wall provided with an opening, a float-plunger arranged to protrude up through said opening and subject to the displacing influence of the liquid in said structure, said structure having means to guide the plunger in a substantially rectilineal course, and a keeper swivelled to the plunger and adapted to be disconnectively attached to said top wall and thereupon hold the plunger depressed.

4. In combination, a liquid tank having a top wall provided with an opening, a casing arranged in the tank and including a head removably fixed in the opening, a depending shell detachably secured to the head and means, fixed to the bottom wall of the tank and into engagement with which the shell is enterable by a downward movement thereof, to laterally support the lower end of the shell, and an up-and-down movable float-plunger including a float and an upstanding stem respectively guided by the shell and head, the casing having means to pass liquid from the tank into the casing and vice versa.

5. In combination, a liquid tank having a top wall provided with an opening, a casing including a hollow structure removably secured in said opening and depending from said top wall and means fixed to the bottom wall of the tank and into engagement with which said structure is enterable by a downward movement thereof, for laterally supporting the lower end of said hollow structure, said casing having restricted means to pass liquid from the tank into the casing and vice versa, and a float-plunger in the casing confined thereby to substantially rectilineal up and down movement and adapted to protrude from the top thereof through said opening.

6. In combination, a liquid tank having a top wall provided with an opening, a casing arranged in the tank and including a head removably secured in said opening and having a vertical bore therethrough, a member removably secured to the bottom of the tank and a tubular shell having separable telescoping connections with both said head and said member, and a float-plunger in the casing confined thereby to substantially rectilineal up and down movement and adapted to protrude up through said bore, said casing having restricted means to pass liquid from the tank into the casing and vice versa.

7. In combination, with a fixed structure including a liquid tank having a top wall provided with an opening and having in its bottom wall a pot-extension in registry with said opening, an up-and-down movable float-plunger arranged to project up through said opening and subject to the displacing influence of the liquid in the tank and adapted on downward movement to be received by the pot-extension, said pot-extension having near its lower end an interior circumferential valve seat and being internally tapered downward below said seat and having at its bottom a normally closed outlet and the plunger being adapted on opening of the outlet to rest on said seat and check the liquid from escaping therethrough.

In testimony whereof I affix my signature.

DAVID T. WILLIAMS.